(12) United States Patent
Potrebic

(10) Patent No.: US 7,380,264 B2
(45) Date of Patent: May 27, 2008

(54) SYSTEMS FOR UNIFYING HETEROGENEOUS MULTIMEDIA TUNERS

(75) Inventor: Peter J. Potrebic, Calistoga, CA (US)

(73) Assignee: Microsoft Corporation, Redmond, WA (US)

( * ) Notice: Subject to any disclaimer, the term of this patent is extended or adjusted under 35 U.S.C. 154(b) by 833 days.

(21) Appl. No.: 10/918,010

(22) Filed: Aug. 13, 2004

(65) Prior Publication Data

US 2006/0035610 A1    Feb. 16, 2006

(51) Int. Cl.
*H04N 7/18* (2006.01)
*H04N 7/16* (2006.01)
*G06F 15/16* (2006.01)

(52) U.S. Cl. ............... 725/74; 725/59; 725/78; 725/85; 725/149; 725/151; 709/229

(58) Field of Classification Search ............ 725/74, 725/78, 80, 86
See application file for complete search history.

(56) References Cited

U.S. PATENT DOCUMENTS

| | | | |
|---|---|---|---|
| 5,630,119 A | 5/1997 | Aristides et al. | |
| 5,657,072 A | 8/1997 | Aristides et al. | |
| 5,684,525 A * | 11/1997 | Klosterman | 725/48 |
| 5,751,282 A | 5/1998 | Girard et al. | |
| 5,802,502 A | 9/1998 | Gell et al. | |
| 5,805,763 A | 9/1998 | Lawler et al. | |
| 5,808,702 A * | 9/1998 | Yoshinobu et al. | 348/731 |
| 5,914,746 A | 6/1999 | Matthews, III et al. | |
| 6,049,823 A | 4/2000 | Hwang | |
| 6,133,910 A * | 10/2000 | Stinebruner | 725/49 |
| 6,598,079 B1 | 7/2003 | Pal et al. | |
| 6,631,523 B1 | 10/2003 | Matthews, III et al. | |
| 6,698,020 B1 | 2/2004 | Zigmond et al. | |
| 6,704,929 B1 | 3/2004 | Ozer et al. | |

OTHER PUBLICATIONS

PCT Written Opinion Of the International Searching Authority.

\* cited by examiner

*Primary Examiner*—John Miller
*Assistant Examiner*—Dominic D Saltarelli
(74) *Attorney, Agent, or Firm*—Lee & Hayes, PLLC

(57) ABSTRACT

A system for unifying heterogeneous multimedia tuners. The system produces a unified channel lineup and coordinates multiple diverse tuners to perform multimedia tasks associated with the unified lineup. In one implementation, tuner allocation policy allows behind-the-scenes tuner assignment and on-the-fly tuner swapping so that the user experience is seamless, access quality is continuously optimized, and tuners with the most bandwidth are kept available.

25 Claims, 7 Drawing Sheets

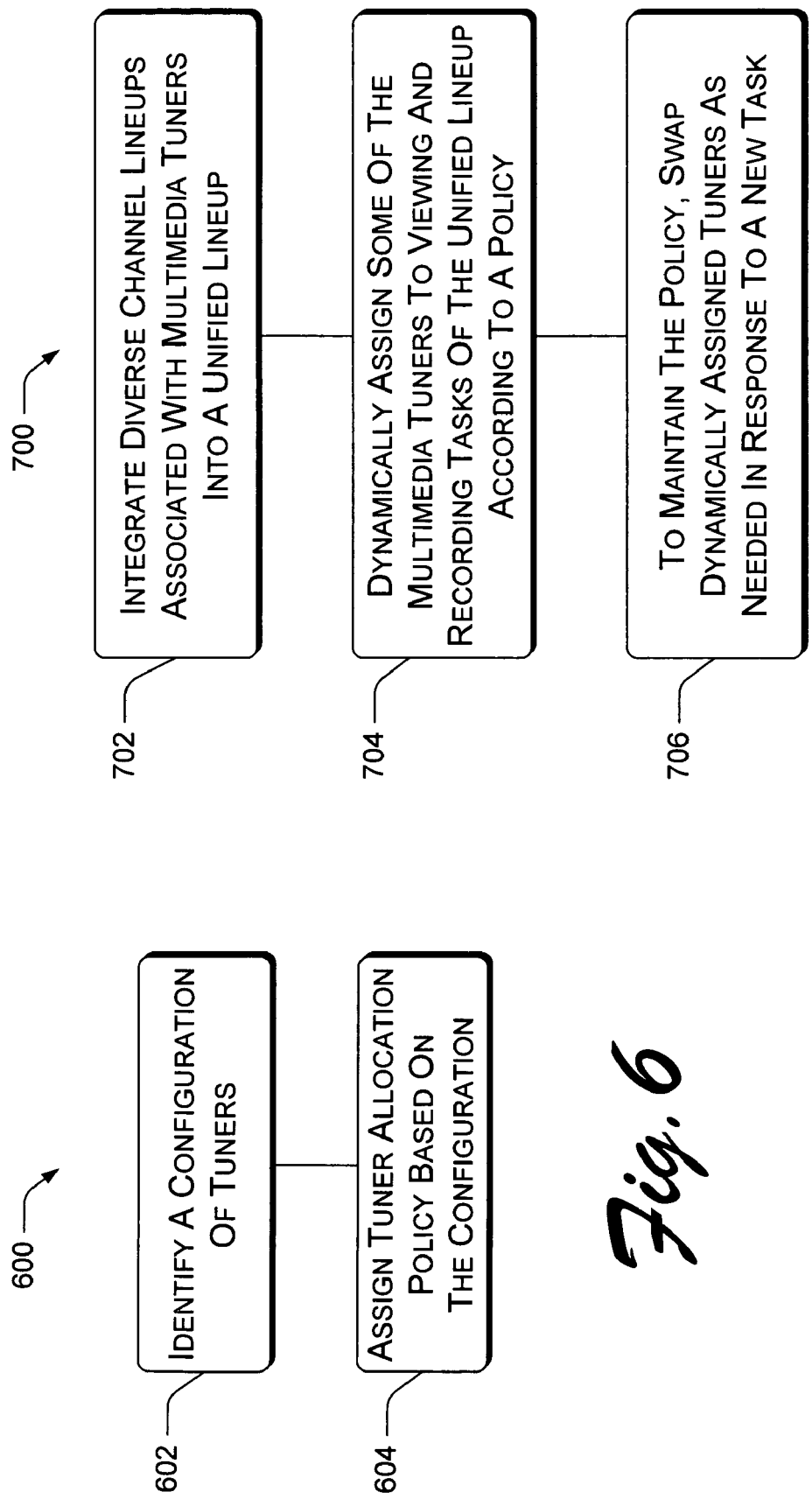

SYSTEMS FOR UNIFYING HETEROGENEOUS MULTIMEDIA TUNERS

TECHNICAL FIELD

The present invention generally relates to TV recording systems, and more particularly, to systems for unifying heterogeneous multimedia tuners.

BACKGROUND

As shown in FIG. 1, multimedia enthusiasts typically connect a collection of different electronic devices in different boxes together to make a modular entertainment center. Ignoring purely audio equipment, the video aspect of the entertainment center may have a television set (TV) 100 that displays multimedia content drawn in from various sources. Channels available via an "over-the-air" (OTA) transmission source 102 and antenna 104 on the receiving side are usually accessed by a tuner inside the TV 100 itself. Additional channels are available by procuring one or more extra set-top boxes to tune different channel lineups, such as a first set-top box 106 to tune a digital channel lineup received via satellite 108, a second set-top box to tune another digital channel lineup received via cable 112, and perhaps a personal video recorder (PVR) 114 to manipulate digital recordings of the received channels. A PVR 114 may exert local influence over one of the set-top boxes 106. Also, some PVRs 114 may include dual identical tuners ("homogenous tuners") so that a user can view and record at the same time. A user, then, may have a number of different tuners ("heterogeneous tuners") in the home, distributed in TVs, VCRs, and other set-top boxes. The various tuners are typically uncoordinated, or coordinated manually by the user through a host of remote controllers 116.

"Access quality" refers to the fidelity (faithfulness to original color, sound, or data); precision; resolution; reliability; speed; capability, etc., with which a tuner can access video, audio, and/or a stream of data distributed with the video and/or audio. Access quality does not include "access quantity," that is, the number of channels that a tuner can access, i.e., the tuner's bandwidth. In other words, in some circumstances the tuner with the highest access quality may only be capable of accessing the least number of channels of any tuner in a group of multiple tuners. This distinction is described more fully below with respect to some implementations of tuner allocation policy. One policy may try to assign a tuner with high access quality first, and another policy may try to assign a tuner that accesses the least number of channels first, if that tuner can get the job done. The latter policy conserves system resources for potential future demands.

"Homogeneous" as used above means that the tuners are identical in supporting the same channel lineup and accessing the identical lineup with the same access quality. For example, a cable system might use a splitter to form two identical signal sources that can be input into two identical tuners to impart the same capabilities to both tuners.

"Heterogeneous" as used above means that multiple tuners support different channel lineups, or the same channel lineup with different levels of access quality. For example, a household might have both cable 112 and OTA antenna 104 channel sources. The channel lineups available through these two sources are likely very different, thus the tuners are considered heterogeneous.

A "tuner" is a conceptual entity that allows a user to access a channel. TVs usually have one, or sometimes two tuners. VCRs usually have one tuner. Some set-top boxes and/or PVRs 114 may have two tuners, as mentioned above. Various removable cards may have one or two tuners. For example, a dual tuner card may have a National Television Standards Committee (NTSC) tuner and an Advanced Television Standards Committee (ATSC) tuner that work dependently or independently of each other.

A "head-end" is the provider of a channel lineup, for example, San Francisco DirecTV; Seattle Comcast Digital Cable; FM Radio, etc. "Transport" is the delivery method for a multimedia signal, e.g., cable, satellite, Internet, OTA, etc. "Format" describes characteristics of the signal, e.g., analog, digital standard definition, digital high-definition, etc.

For electronic program guides (EPGs), an "interlaced" or "interleaved" guide view has multiple guide lineups that are interwoven and sorted in some manner (e.g., by channel number), while a "merged" guide view has multiple lineups that are merged but the same channels are collapsed where they overlap.

A given PVR 114 may enlist a computing device for digital management or the PVR 114 may comprise a computing device. The computing device usually provides the operating system for one or more hard drives and therefore aids primarily in the storage and retrieval of multimedia content that is in the form of stored digital files.

For users with computerized or non-computerized entertainment center platforms, a framework or architecture is needed to support and unify an arbitrary number of homogeneous and heterogeneous tuners. In other words, a framework is needed to seamlessly receive and distribute multiple TV signals in order to unify a user's "multiple-TV/multiple-VCR" experience.

SUMMARY

A system for unifying heterogeneous multimedia tuners is described. The system is capable of producing a unified channel lineup and coordinating multiple diverse tuners to perform multimedia tasks associated with the unified lineup. In one implementation, tuner allocation policy allows behind-the-scenes tuner assignment and on-the-fly tuner swapping so that the user experience is seamless, access quality (such as, video quality) is continuously optimized, and tuners with the most bandwidth are kept available.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIG. 6 is a flow diagram of an exemplary method of unifying multiple heterogeneous multimedia tuners.

FIG. 7 is a flow diagram of an exemplary method of allocating tuners to empower a user experience.

DETAILED DESCRIPTION

Overview

A conventional single tuner automatically provides a somewhat consistent user experience (UX), although viewing and recording tasks are limited because one tuner must be shared. With conventional dual homogeneous tuners some extra control logic is required, but existing PVR products have shown that a seamless user experience is possible for a dual homogenous tuner system. The subject matter described herein integrates an arbitrary number of homogeneous and/or heterogeneous multimedia tuners to provide a user experience that is unified, consistent, and seamless. The seamless user experience described herein is powerful, in that the subject matter allows more possibilities than conventional systems, such as recording multiple programs at the same time or watching live TV in standard definition while recording a high definition program in the background. Channel surfing, scheduling, conflict management, etc, can take advantage of the multiple heterogeneous tuners unified as described herein.

Exemplary Systems 200, 300

Figure 1:
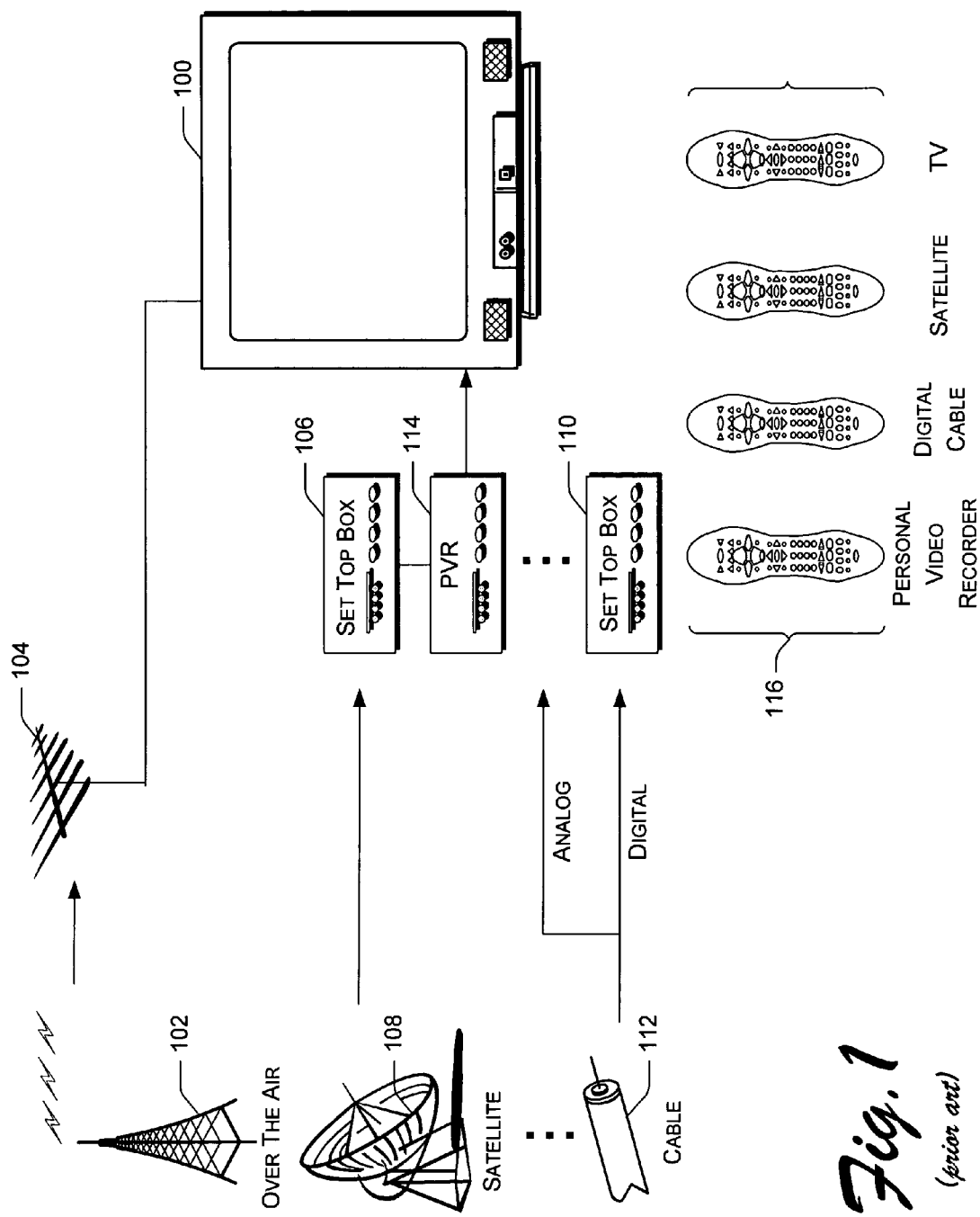
FIG. 1 is a graphical representation of a conventional array of uncoordinated components of a multimedia system.
Figure 2:
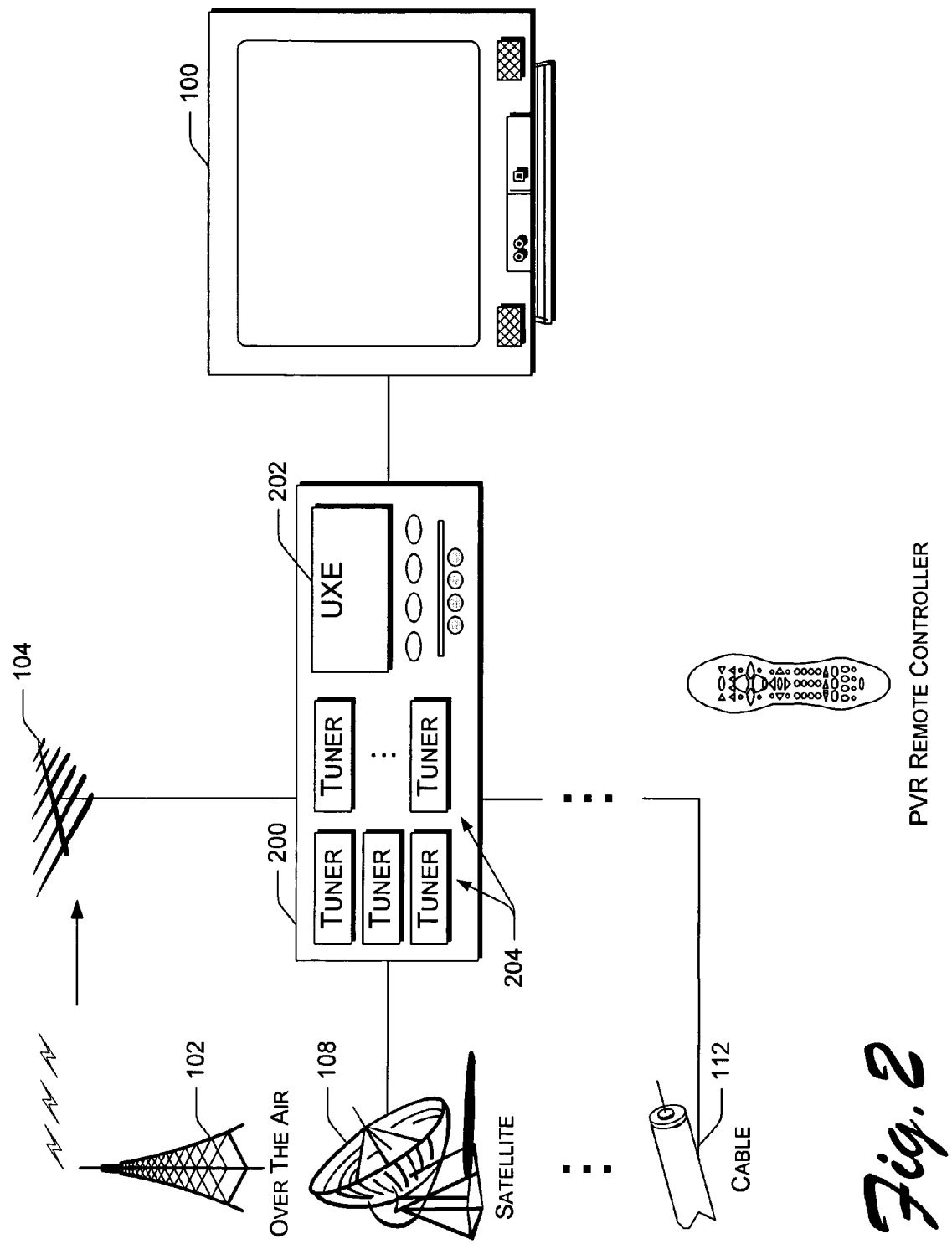
FIG. 2 is a graphical representation of an exemplary personal video recorder (PVR) that includes an exemplary user experience engine (UXE) to unify multiple heterogeneous tuners.

FIG. 2 shows an exemplary PVR system 200 in which an exemplary user experience engine (UXE) 202 integrates several aspects of multiple tuners 204. In one implementation, the exemplary PVR system 200 physically contains the multiple tuners 204, although this is not required.

The exemplary UXE 202 is capable of integrating the diverse channel lineups of the multiple tuners 204 into a unified channel lineup, whether the multiple tuners 204 are onboard or offboard. Correspondingly, the exemplary UXE 202 is also capable of integrating the diverse electronic program guide (EPG) metadata that usually accompany and describe each diverse channel lineup.

Besides providing the user with an integrated and seamless channel lineup and an integrated and seamless EPG, the exemplary UXE 202 is also capable of managing, the various tuners. For example management can include assigning the tuners to multimedia tasks, according to policy. For example, the UXE 202 responds to user requests for viewing and recording various channels in the unified channel lineup by assigning an appropriate tuner. The management of tuners provided by the exemplary UXE 202 is dynamic. Thus, depending on policy, management by an exemplary UXE 202 may include swapping tuners in or out of an assignment "on-the-fly" to provide real time enforcement of policy, furthering the seamless user experience.

Policy may be comprehensive, so that an exemplary UXE 202 can integrate very diverse combinations of multimedia tuners. Of course, many tuner assignment policies within an overall body of policy for an exemplary UXE 202 can be user-selectable. In one implementation, an exemplary UXE 202 detects and classifies the configuration of tuners that are present and assigns and/or tweaks policy depending on the classification. In short, an exemplary UXE 202 provides a single framework within which many various configurations of tuners can be organized to provide a unified and more powerful user experience.

Figure 3:
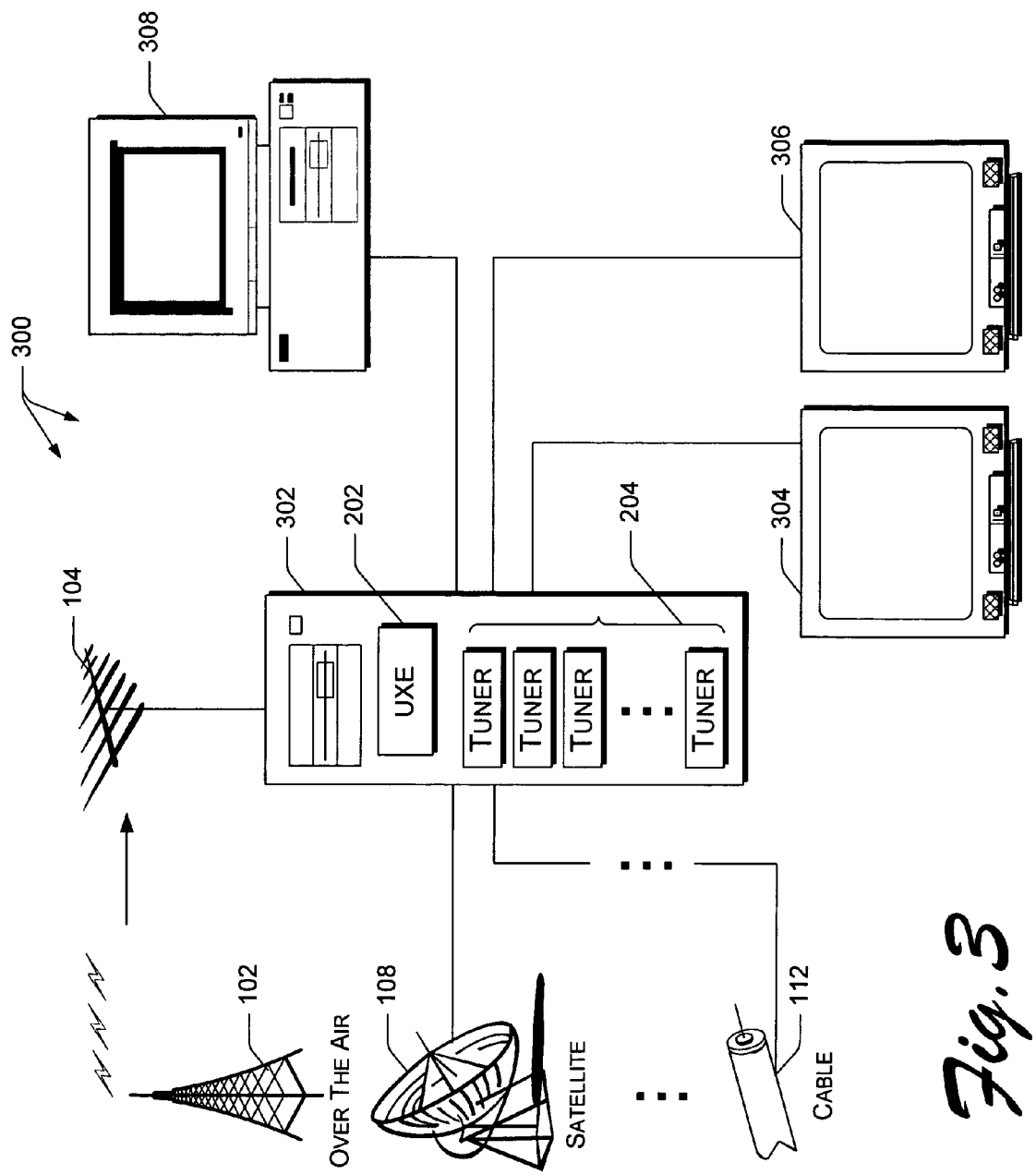
FIG. 3 is a graphical representation of an exemplary home multimedia network that includes an exemplary user experience engine (UXE) to unify multiple heterogeneous tuners.

FIG. 3 shows an exemplary home entertainment network 300 in which an exemplary UXE 202 resides in a multimedia server 302 that may function as a hub for the entertainment network 300. An exemplary computing device environment suitable for practicing the illustrated implementation of an exemplary UXE 202 is described more fully with respect to FIG. 8.

The multimedia server 302 is capable of storing and sending multimedia content to remote displays 304, 306 and remote personal computers 308 located in different rooms of a home. Multiple heterogeneous tuners 204 physically reside in the illustrated multimedia server 302, although this is not required. The exemplary UXE 202 produces a unified channel lineup from diverse channel lineups of the heterogeneous tuners 204 as well as a unified EPG. In response to requests for multimedia content from the remote displays 304, 306 and remote personal computer 308, the UXE assigns a tuner to each multimedia task, according to policy. In order to maintain policy, the UXE 202 may dynamically reassign or swap tuners depending on an updated state of the network 300, i.e., in response to incoming requests for multimedia content that may require services of a tuner that has already been assigned.

In one implementation, policy includes the principle of assigning a tuner with a better access quality to a task (e.g., viewing or recording) prior to assigning a lesser quality tuner to that same task. Policy may also include the further principle of assigning and swapping tuners in such a manner that resources are used most efficiently. For example, a policy may include assigning a tuner that is capable of a lesser access quantity, if it can get the job done, to a task prior to assigning a tuner capable of a higher access quantity, i.e., the tuner capable of the least access quantity that can do the job properly may be assigned first. This leaves the more powerful resources free and uncommitted for as long as possible for future demands. Using policies that embody one or both of these exemplary principles can have the effect of streamlining a whole body of policies for unifying multiple tuners. That is, if a single tuner with better than average access quality is designated as the primary viewing tuner and primary recording tuner, then this primary tuner is assigned first, if it is available. Other policies are then built around how to assign lesser tuners to subsequent tasks in order to most efficiently allocate resources or, how to swap a lesser tuner for the primary tuner when the primary tuner would be put to better use elsewhere. Of course, these same policies apply to audio tuners, audio-video tuners, data receivers-that is, to all multimedia tuners. More example policies are presented later in this detailed description.

Whether any individual policy or rule can be fulfilled depends on the number and types of requests that are active at any moment. An exemplary UXE 202 that is inundated with viewing requests, for example, may allocate a limited number of high video quality tuners to the viewing tasks as best it can, but may still have to rely on lower video quality tuners to meet all the requests.

Exemplary User Experience Engine (UXE)202

Figure 4:
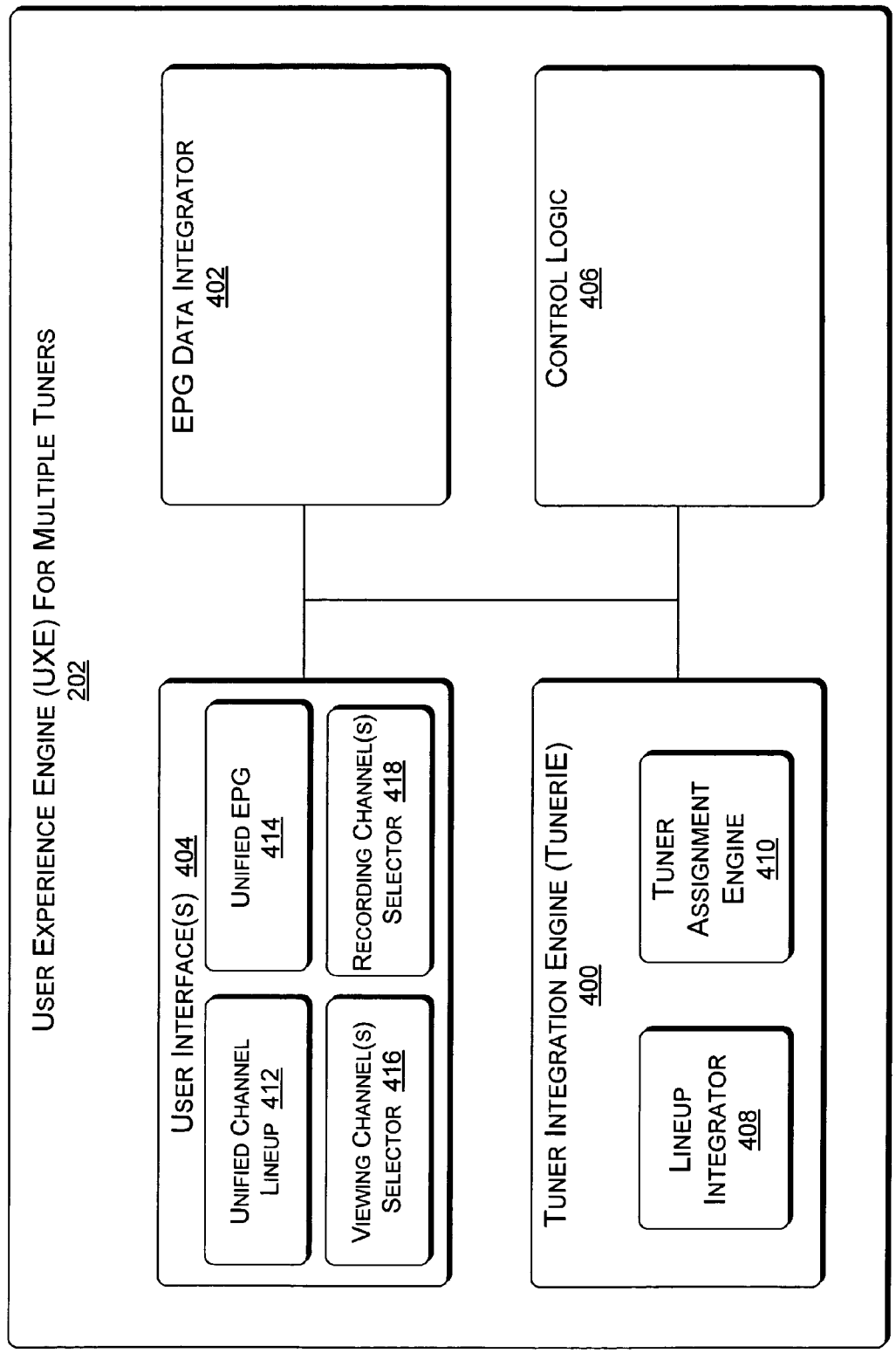
FIG. 4 is a block diagram of the exemplary UXE of FIGS. 2 and 3 in greater detail.

FIG. 4 shows an exemplary UXE 202 in greater detail. In one implementation, a tuner integration engine (TunerIE) 400 is communicatively coupled with an EPG data integrator 402, user interfaces 404, and control logic 406, as illustrated. The TunerIE 400 may include a lineup integrator 408 and a tuner assignment engine 410 and will be discussed in greater detail below, with respect to FIG. 5. In one implementation, the user interfaces 404 may include interactive displays of a unified channel lineup 412, a unified EPG 414, a viewing channel(s) selector 416, and a recording channel(s) selector 418. Other conventional user interface components that can be adopted or adapted for providing a unified user experience can also be included in the user interfaces 404.

The EPG data integrator 402 may rely on a unified channel lineup produced by the lineup integrator 408 as a starting point for creating the unified EPG 414. For example, EPG data can be simply merged. That is, for multiple duplicated channels, any unique EPG data is accumulated under the common channel number to which the duplicated channels are mapped. Alternatively, the EPG data may be integrated in another manner.

It should be noted that an exemplary UXE 202 can be implemented in software, hardware, or combinations of both hardware and software. Certain of the user interfaces 404 may be implemented on various display devices. For example, a unified channel lineup 412 can be displayed on a remote controller 116 if the exemplary UXE 202 is implemented in a PVR system 200, or alternatively the unified channel lineup 412 can be displayed on the monitor of a computing device, if the exemplary UXE 202 is implemented in an entertainment multimedia network 300.

Exemplary Tuner Integration Engine 400

Figure 5:
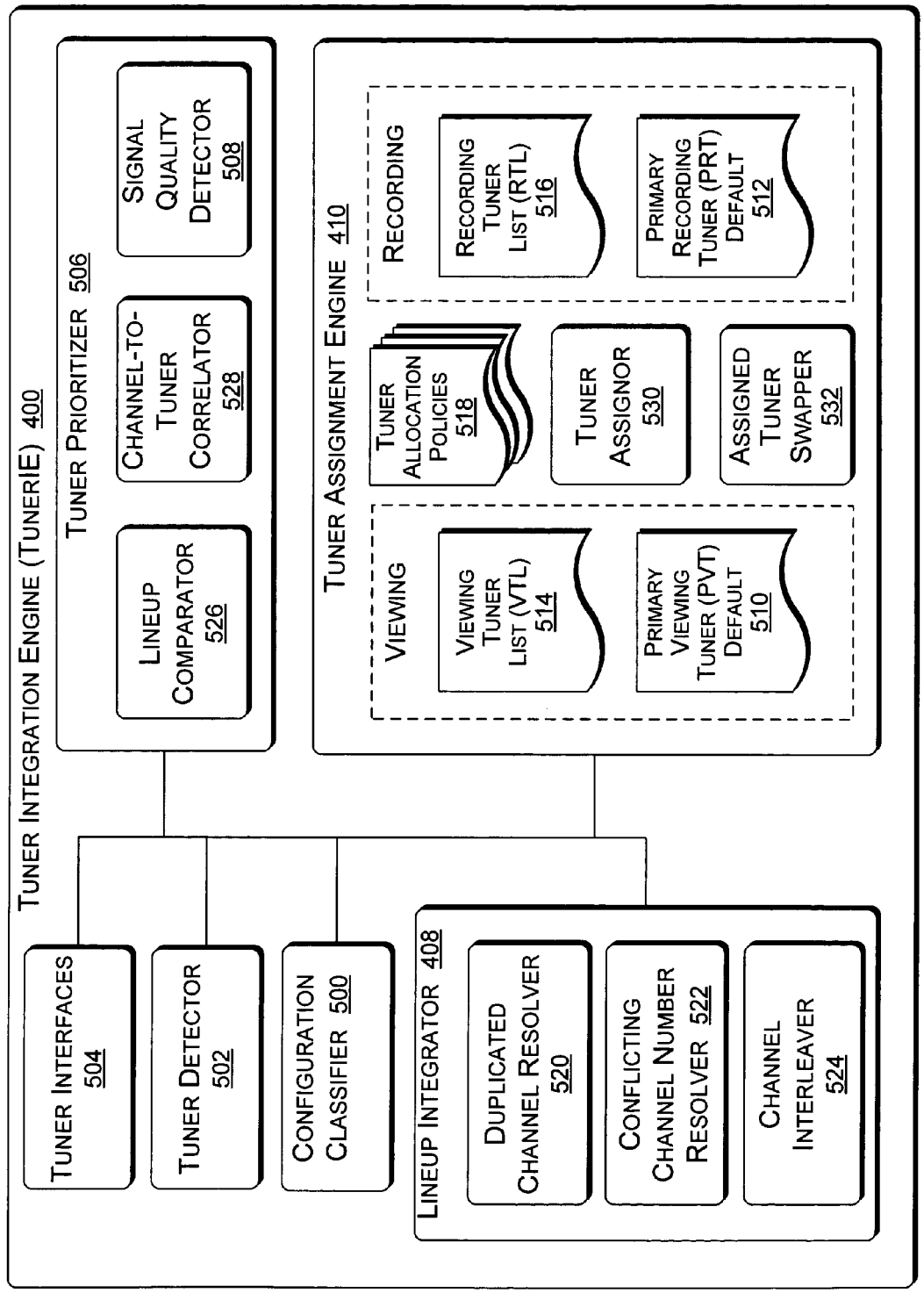
FIG. 5 is a block diagram of an exemplary tuner integration engine of an exemplary UXE.

FIG. 5 shows an exemplary TunerIE 400 in greater detail. An exemplary TunerIE 400 includes a lineup integrator 408 and a tuner assignment engine 410, mentioned above and discussed in greater detail below. The lineup integrator 408 and tuner assignment engine 410 may be communicatively coupled with a configuration classifier 500, a tuner detector 502, tuner interfaces 504, and a tuner prioritizer 506 as illustrated.

The configuration classifier 500 identifies a configuration of multiple tuners 204 that are connected via the tuner interfaces 504 and detected by the tuner detector 502. That is, the configuration classifier 500 determines or assigns relationship(s) between the tuners in the connected and detected set of tuners. The relationships need not be pre-existing or hardware related. Relationships between tuners can be assigned to the tuners, and accordingly, configurations can be assigned in whole or in part, not just determined from physical and functional characteristics of tuners in a given connected and detected set. It is worth noting that in some implementations, a driver must be installed for the tuner detector 502 to detect a new tuner (one that has never been configured).

A configuration determined or created by the configuration classifier 500 can provide a starting point or frame of reference for determining tuner assignment policies and for operating the lineup integrator 408, the tuner prioritizer 506, and the tuner assignment engine 410.

In one implementation, the configuration classifier 500 classifies a given set of tuners according to the channel lineups they access and according to the access quality that they are capable of achieving. The channel lineup that each tuner is capable of accessing can be determined automatically. The access quality can be determined either automatically, manually (by asking a user which displayed quality is higher), or by a combination of both. After classification, a given set of tuners will fall into one of several possible configurations. For example, if the channel lineups produced by multiple tuners are identical and the access quality is the same then the configuration is "homogeneous," if the channel lineups are different, then the configuration is "heterogeneous." If the channel lineups have no channels in common then the configuration can be termed "heterogeneous disjointed," whereas if the channels of one lineup are a subset of the other lineup, then the configuration can be termed "heterogeneous subseted." If a first lineup has some common channels with a second lineup but also some unique channels over the second lineup, and vice versa, the two tuners may be classified as "heterogeneous non-subseted."

Various combinations of two tuners and their likely configurations as determined by a configuration classifier 500 are shown below in Table (1) as examples. An individual tuner in one of the combinations may be a tuner for digital cable or satellite, a tuner for over-the-air National Television Standards Committee channels (OTA NTSC), or a tuner for over-the-air Advanced Television Standards Committee channels (OTA ATSC).

TABLE 1

Dual Tuner Sets with Nominal Configurations

| | TUNER SET | CONFIGURATION |
|---|---|---|
| A | Analog Cable/Analog Cable | Homogeneous |
| B | Satellite/Satellite | Homogeneous |
| C | OTA NTSC/OTA NTSC | Homogeneous |
| D | Analog Cable/OTA ATSC | Heterogeneous, Disjointed lineups |
| E | Digital Cable/OTA ATSC | Heterogeneous, Disjointed lineups |
| F | Satellite/OTA ATSC | Heterogeneous, Disjointed lineups |
| G | OTA NTSC/OTA ATSC | Heterogeneous, Disjointed lineups |
| H | Digital Cable/Analog Cable | Heterogeneous, Subseted |
| I | OTA ATSC/OTA ATSC | Homogeneous |
| J | Analog Cable/OTA NTSC | Heterogeneous, Non-subseted lineups |
| K | Digital Cable/OTA NTSC | Heterogeneous, Non-subseted lineups |
| L | Satellite/OTA NTSC | Heterogeneous, Non-subseted lineups |
| M | Satellite/Analog Cable | Heterogeneous, Non-subseted lineups |
| N | Satellite/Digital Cable | Heterogeneous, Non-subseted lineups |

Rows "A-C" and row "I" in Table (1) have analog tuner combinations that are homogeneous configurations. For homogeneous tuners, the system silently combines line-ups into one resource. There are no changes in the EPG. The appropriate components in the TunerIE 400 are informed that any given channel is available on multiple homogeneous tuners.

Rows "D-G" of Table (1) are heterogeneous tuner combinations that have completely disjointed channel lineups.

Row "H" is a heterogeneous subseted combination in which the channel lineup of one tuner is a subset of the channel lineup of the other tuner.

Rows "J-N" are heterogeneous non-subseted tuner combinations in which only a segment of the channel lineup of one tuner is a subset of the channel lineup of the other tuner-each tuner also has unique channels over the other tuner.

These configuration classes can be further refined according to other characteristics, for example, according to a tuner's level of access quality-i.e., the resolution, definition, and image quality, etc., that a tuner is capable of achieving. The issue of access quality will be discussed again below with respect to the lineup integrator 408 and with respect to a signal quality detector 508 that may reside in the tuner prioritizer 506.

The example configuration classes of Table (1), as refined further according to the above-described characteristic of access quality, are shown in Table (2):

TABLE 2

Tuner Set Configurations

| | CONFIGURATIONS |
|---|---|
| A | Homogeneous |
| B | Heterogeneous, Disjointed |
| C | Heterogeneous Subseted, Equivalent Access Quality |

TABLE 2-continued

Tuner Set Configurations

| | CONFIGURATIONS |
|---|---|
| D | Heterogeneous Subseted, Non-equivalent Access quality |
| E | Heterogeneous, Non-subseted, Equivalent Access quality |
| F | Heterogeneous, Non-subseted, Non-equivalent Access quality |

A particular configuration that fits into one of the classes shown in Tables (1) and/or (2) can be further articulated by selecting a primary viewing tuner 510 and a primary recording tuner 512 for the configuration. In some implementations, a viewing tuner list 514 can be implemented instead of a primary viewing tuner 510. The viewing tuner list 514 can be prioritized to first allocate tuners with the strongest manifestation of the prioritization characteristic. Likewise, a recording tuner list 516 can be implemented instead of a primary recording tuner 512, and the recording tuner list 516 can be prioritized to allocate preferred tuners first.

The configuration classifier 500 can often determine which configuration to adopt based on: 1) which tuner is selected as the primary viewing tuner 510;2) which tuner is selected as the primary recording tuner 512 (often the same tuner is selected as the primary viewing tuner 510 and the primary recording tuner 512); and 3) whether a recording can be automatically shifted between duplicated channels across tuners. These three parameters can be determined automatically by the configuration classifier 500 or by asking the user via a user interface 404, e.g., during a setup operation. The three parameters often place a particular set of tuners into one of the above configurations of Table (1) and/or Table (2). Once the configuration is determined, the exemplary TunerIE 400 is capable of modeling the entire user experience, including the unified EPG, tuner allocation policies 518, methods of channel changing, etc.

A primary viewing tuner 510 can be used to resolve conflicts and ambiguities when fulfilling requests for tasks related to viewing (e.g., live TV), especially over channels that are duplicated on multiple tuners. When a user requests access to a channel, and that channel is available on multiple tuners, the exemplary TunerIE 400 prefers to use the primary viewing tuner 510. The primary recording tuner 512 performs according to the same concepts, except with respect to recording tasks. Recording requests prefer to use the primary recording tuner 512 for channels that are duplicated across tuners. Designating a primary viewing tuner 510 and a primary recording tuner 512, provides the benefit that viewing and recording tasks tend to stay out of each others way, i.e., a given task resolves more neatly into either a viewing task or a recording task without entanglement.

A primary viewing tuner 510 and a primary recording tuner 512 are only default preferences that aim to streamline policy and optimize performance. It is possible and likely that in certain circumstances an exemplary TunerIE 400 will end up using a primary viewing tuner 510 to perform recording and not viewing, and will end up using a primary recording tuner 512 for viewing and not recording.

Exemplary Unified Lineup

The lineup integrator 408 unifies channel lineups associated with the multiple tuners 204 into a unified channel lineup. The process of unifying depends on the diverse channel lineups to be unified. If the channel lineups are disjointed, that is, they have no channels in common, then unification is relatively simple as there are no conflicts in channel numbering and all channels are distinct with unique channel numbers.

In creating the unified channel lineup, if one constituent channel lineup is a subset of another constituent channel lineup, then there are usually no conflicts in channel numbering. However, the subseted channels are duplicates, i.e., the duplicated channels each claim the same channel number. The lineup integrator 408 may thus include a duplicated channel resolver 520 and a conflicting channel number resolver 522.

The duplicated channel resolver 520 is capable of determining what to do with channels duplicated across multiple tuners that can access the channel at the same level of quality. One possibility is to discard the "duplication" for purposes of the unified lineup. But, in most cases, the duplicated channel resolver 520 records the fact that there are two tuners available to tune a channel so that this can be taken advantage of later. A user may have analog cable and analog antenna, for instance, with the cable headend preferred and represented by the primary viewing tuner 510. The service "NBC" may be on channel 3 in the analog cable lineup but "NBC" is on channel 11 on analog antenna. The user will only see one NBC in the EPG on channel 3 , but either may be used to match an available tuner to a requested task.

In a heterogeneous non-subseted configuration, there are two sorts of problems to be resolved. These resolutions can occur during a setup or "first run" system registration. In one case, two different services (channels) use the same channel number. For example, on a first tuner, channel number 101 is the service "ESPN" while on a second tuner, channel 101 is the service "HSN." The conflicting channel number resolver 522 may assign one of the services to a unique channel number, wherein the channel interleaver 524 may assist in selecting a channel number that places the service among similar programs.

In another case, two matching services have different channel numbers on different tuners. For example, the service "CNN" is on channel 12 on a first tuner but "CNN" is on channel 204 on a second tuner. The duplicated channel resolver 520 may map the service on both tuners to one channel number in the unified lineup, but assign one of the tuners to a task based on whether the other tuner is already busy.

The tuner prioritizer 506 may also include a lineup comparator 526 and a channel-to-tuner correlator 528 in addition to the aforementioned signal quality detector 508. The tuner prioritizer 506 selects a primary viewing tuner 510 and a primary recording tuner 512 in the case where there are only two tuners to be integrated, or the tuner prioritizer 506 creates prioritized lists, that is, the viewing tuner list 514 and the recording tuner list 516 (viewing tuner list and recording tuner lists, as discussed above) when there are many tuners to be integrated.

The lineup comparator 526 prioritizes a list of tuners by the number of channels (lineup) that each tuner on the list can access. This type of prioritization is important for optimizing performance and conserving system resources. An exemplary policy tries to keep tuners that can access the most channels free for use. In other words, policy may dictate that a tuner that can access more channels than other tuners is not used as a first choice to perform a task if another tuner can do the job just as well.

The channel-to-tuner correlator 528 may receive input from the lineup integrator 408 , namely the unified channel lineup and duplicated channels, and/or may use a prioritized tuner list created by the tuner prioritizer 506 itself as a starting point. The channel-to-tuner correlator 528 associates each tuner on a prioritized list with the channels that it can access. In other words, for example, a tuner may have highest priority on a viewing tuner list 514, and therefore be "on deck" to be called up first to fulfill a user request, but that does not mean that the tuner actually has the capability to tune the requested channel. So, the channel-to-tuner correlator 528 may create a database of prioritized tuners and associate channels with each tuner.

Because signal sources are different, the audio-video access quality may be similar or different between tuners on a prioritized list. The access quality may be similar (or the same) if, for example, a digital cable /analog cable configuration is such that duplicated channels are identical copies, e.g., when a splitter divides the same cable source into a digital branch and an analog branch. In this case, since analog and digital channels are the same the duplicated channels can merely be treated as homogeneous. This allows an exemplary TunerIE 400 more flexibility in providing a seamless user experience when dealing with these duplicated channels.

The access quality, however, may often be different between tuners tuning the same channel. Not all digital cable, for example, has the same characteristics. Further, a signal's course through a set-top box may slightly alter quality. Digital channels are also subject to IR (infra-red) "blasting" and user interface overlays, imposed by a set-top box whereas a corresponding analog channel is not subject to these. Finally when comparing OTA NTSC channels with corresponding satellite or cable channels, the level of quality is often different.

If the level of quality is different when two different tuners have access to the same channel, then it is preferable to represent the channel only once in the unified channel lineup 412 and the unified EPG 414, but keep the underlying channels distinct to take advantage of both tuners, as mentioned above.

A prioritized list of tuners, such as a viewing tuner list 514 or a recording tuner list 516, may be further prioritized by separate or additional characteristics besides the number of channels that each tuner can access. The signal quality detector 508, for example, may measure or accept user input indicating the access quality of tuners to be prioritized. Thus, a viewing tuner list 514 and a recording tuner list 516 may also be prioritized by signal quality (the access quality) of the tuners, where the signal quality is used as a primary or secondary prioritizing criterion. In other words, a prioritization formula may be used that incorporates multiple weighted sorting characteristics.

In one implementation of an exemplary viewing tuner list 514, the primary prioritization sort is based on the quality of the video signal, with highest quality first, and the secondary sort is based on the size of the channel lineup, with the largest first. Likewise, in one implementation of an exemplary recording tuner list 516, the primary sort is based on the quality of the video signal, with highest quality first, and the secondary sort is based on the size of the channel lineup, with the smallest first. When starting a recording, for example, the tuner assignor 530 can remove from the recording tuner list 516 any tuner that does not access the requested channel/service, and then assign the first available tuner left on the list.

The tuner assignment engine 410 may include a tuner assignor 530 and an assigned tuner swapper 532 that utilize the aforementioned primary viewing tuner 510, primary recording tuner 512, viewing tuner list 514, recording tuner list 516, and the tuner allocation policies 518. The tuner assignor 530 dynamically assigns the tuners to user requests to view and/or record channels of the unified channel lineup 412 (referred to as "multimedia tasks" or just "tasks") according to the tuner allocation policies 518. The assigned tuner swapper 532 swaps a dynamically assigned tuner as desired to uphold one of the policies 518, usually in response to a request for performance of a new task, i.e., a new task for a tuner that is already in use. Thus, the tuner assignment engine 410 comprises a dynamic resource allocator that functions in the background assigning tuners and swapping them according to policies 518 in order to maintain a seamless user experience.

Exemplary Tuner Allocation Policies 518

Exemplary tuner allocation policies 518 can enrich the seamlessness and power of a user experience presented herein for digital media enthusiasts. Policies can be adopted for each of the many aspects of tuner allocation.

Only simple policies are needed for some configurations of multiple tuners, and are described immediately below, followed by more detailed exemplary policies applicable to particular multimedia tasks, such as viewing, recording, channel surfing, etc.

Homogeneous Tuners Configuration

In this configuration, by selecting an arbitrary homogenous primary viewing tuner 510 and then selecting another homogeneous tuner for a primary recording tuner 512 the tuner prioritizer 506 simplifies tuner allocation policies 518. There is little need to address special cases in tuner configurations when all the tuners are equal and there is no preferred tuner. But by selecting a primary viewing tuner 510 and a primary recording tuner 512, the policies may run more efficiently and neatly because it simplifies decisions to have background recordings preprogrammed to use one tuner while live TV is preprogrammed to use another tuner.

Heterogeneous Disjointed Tuners Configuration

In this configuration, selecting a primary viewing tuner 510 and a primary recording tuner 512 may be irrelevant if the number of tuners to be integrated is small. This is because each channel may only appear on one tuner /headend. Thus, the policies may "filter out" other tuners that do not access a requested channel.

Exemplary Policies for a Unified EPG ("Unified Guide")

In the exemplary configurations described herein, the guide is merged either by interleaving channels and their associated EPG data or by some other union of collective EPG data. Unique channels and their associated EPG data, of course, appear on their own, in order of channel number. Channel numbering conflicts are ideally resolved from the outset.

Heterogeneous disjointed configurations: the guide is effectively interleaved. In these configurations the secondary tuner is sometimes ATSC with a limited number of channels. Accordingly, the interleaved channels can be, for example, 7,7.1, 7.2, 8, 9, etc.

Heterogeneous subseted configurations: the guide effectively shows only the lineup for the primary viewing tuner 510. Internally the lineups might be merged, but there is nothing noticeable to the user in the unified EPG 414.

Heterogeneous non-subseted configurations: the guide shows the union of all channels. Duplicate channels are merged. Unique channels appear in their natural order of channel number.

Exemplary Policies for Channel Surfing

Channel surfing most often follows the guide.

Heterogeneous disjointed configurations: surfing silently hops from tuner to tuner, following the order of channels in the guide.

Heterogeneous subseted configurations: most live TV viewing uses the primary viewing tuner primary viewing tuner 510. The user cannot discern which tuner is being utilized. Typically the user just surfs over the lineup of the primary viewing tuner 510.

Heterogeneous non-subseted configurations: the primary viewing tuner 510 is used when tuning to a channel that is duplicated. Otherwise a tuner that has access to the requested channel is used, following the channel order shown in the guide.

Exemplary Policies for Recording Tasks

These policies may be employed to allocate tuners when a recording starts or to reserve tuners when a recording is scheduled.

If only one tuner has access to the requested channel then the tuner assignor 530 uses that tuner.

If more than one tuner has access to the requested channel then the primary recording tuner 512 is used, if available.

If a primary recording tuner 512 is busy then

If another tuner has equivalent access quality, then the other tuner can be used if it is available.

If other tuners do not have equivalent access quality, then user confirmation may be solicited to swap tuners. In one implementation, confirmation is only solicited if the correct user is available for asking. The correct user is the one that initiated the recording on the higher quality tuner. A usual case occurs when the user first requests to record some program. If the higher quality tuner is not available to do the recording (for whatever reason) and a lesser quality tuner is available, then in this case the system may ask the user for approval.

If all tuners that have access to the requested channel are busy, then the user experience shifts to accommodate the condition, for example by displaying a "tuners unavailable" message, offering the user options for freeing up a tuner (including stopping the activity that the tuner to be recruited is busy with), etc.

Heterogeneous subseted configurations: the tuner assignor 530 tries to use the primary recording tuner 512 first for duplicated channels. This keeps the primary viewing tuner 510 available more often for viewing requests. Of course a second overlapping recording might use the primary viewing tuner 510 for recording if there is a limited set of tuners.

Heterogeneous non-subseted configurations with equivalent access quality between tuners: the same policy as immediately above may be used.

Heterogeneous non-subseted configurations with non-equivalent access quality between tuners: the tuner assignor 530 defaults to viewing live TV on a primary viewing tuner 510. However, since the tuners do not provide equivalent access quality, user confirmation may be solicited in order to use a different tuner, if the correct user is available, as described above.

Exemplary Policies for Recording a Program that is already Airing

Tuner allocation policies 518 are substantially the same as just described above for the recording policies.

Heterogeneous subseted configurations: the primary recording tuner 512 is used if possible and swapped with the primary viewing tuner 510 if the primary viewing tuner 510 is currently viewing the same channel, in order to free the primary viewing tuner 510. In other words, if the user who initiates the recording is already watching the program that is about to start recording and the tuner being used for this is the primary viewing tuner 510, then the user's viewing experience can be swapped to the primary recording tuner 512 and the recording started with the primary recording tuner 512. This frees up the primary viewing tuner 510 for other uses.

Heterogeneous non-subseted configurations: the tuner assignor 530 cannot automatically swap between two tuners if the access quality is different between the tuners (unless the user has okayed this though some sort of UI, either at startup or through a configurations/settings UI). The user interface 404 may display a message, such as the example message, "Requested channel cannot be recorded on channel 383 using your Satellite tuner, but the requested channel can be recorded using NBC received over your antenna."

Exemplary Policies for Channel Surfing while Recording

An overlay model can be used to present scenarios where a requested tuner is busy. The UI 404 can indicate that the tuner is busy recording and can present appropriate options. Since an overlay can be part of the TV experience its display does not prevent further channel changing/surfing. Alternatively, a "no tuners available" circumstance can block further channel surfing, e.g., in a modal dialogue approach.

If only one tuner has the requested channel then the tuner assignor 530 uses that tuner.

If there is a tuner currently recording on the destination channel, then use that tuner (i.e., using swapping, if necessary).

If more than one tuner has the requested channel then use the primary viewing tuner 510 if available.

If the primary viewing tuner 510 is busy then

If another tuner has equivalent access quality then use the other tuner if it is available.

If another tuner does not have equivalent access quality then get user confirmation to swap tuners.

If all tuners that can access the channel are busy, then display a "tuners busy" overlay.

Heterogeneous subseted configurations: there are not any duplicated channels. When the user tunes to a channel on a busy tuner the "tuners busy" overlay is displayed.

Heterogeneous subseted configurations: the tuner assignor 530 uses the primary viewing tuner 510 if possible. If the primary viewing tuner 510 is busy, then the tuner assignor 530 uses another tuner when possible (i.e., for duplicated channels).

Heterogeneous non-subseted configurations with non-equivalent access quality between tuners: the tuner assignor 530 cannot automatically swap between tuners since the access quality is different. However a "tuner busy" overlay can include information and options to quickly move to a duplicated channel. This is equivalent to the user having to affirmatively confirm shifting a recording from one tuner to another. Since quality is different user confirmation is solicited.

Exemplary Policies for Starting Live TV

The policies are substantially the same as the policies for channel surfing-to default to the last viewed taking into account:

If only one tuner has the requested channel then the tuner assignor 530 uses that tuner.

If there is a tuner that currently recording on the destination channel, then the tuner assignor 530 uses that tuner.

If more than one tuner has the channel then the tuner assignor 530 uses the primary viewing tuner 510 if available.

If the primary viewing tuner 510 is busy then

If tuners have equivalent access quality then they can be automatically swapped.

If tuners do not have equivalent access quality the user confirmation is solicited to swap tuners.

If all tuners that have access to the channel are busy, then display a "tuners busy" overlay.

Exemplary Policies for Swapping Tuners

These policies cover a circumstance in which a user attempts to tune to a channel that is already being recorded or when a user tunes away from a channel that is recording.

Heterogeneous disjointed configurations: no swapping occurs because the channel lineups are disjointed, i.e., mutually exclusive.

Heterogeneous subseted configurations with equivalent access quality between tuners: the tuner assignor 530 swaps to the tuner that is doing the recording. When tuning away while recording, if tuning to a channel available on a free tuner than switch to that free tuner.

Heterogeneous non-subseted configurations with equivalent access quality between tuners: the tuner assignor 530 swaps to the tuner that is doing the recording. When tuning away while recording, if tuning to a channel available on a free tuner than switch to that free tuner.

Heterogeneous non-subseted configurations with non-equivalent access quality between tuners: because the access quality differs the tuner assignor 530 cannot automatically swap tuners unless the user has okayed this though a setup or configurations/settings UI. A "tuner busy" overlay can include options for swapping to another tuner.

Exemplary Methods

FIG. 6 shows an exemplary method 600 of unifying multiple heterogeneous multimedia tuners. In the flow diagram, the operations are summarized in individual blocks. The operations may be performed in hardware and/or as machine-readable instructions (software or firmware) that can be executed by a processor or engine, such as an exemplary TunerIE 400 of an exemplary UXE 202.

At block 602, a configuration of tuners is identified, e.g., by a tuner detector 502 of an exemplary TunerIE 400. The identification of individual tuners can be performed automatically, for example, if tuner drivers are installed. In one implementation, a user is polled during system setup for the number and/or types of multimedia tuners installed. Once an exemplary TunerIE 400 has inventoried the connected tuners, the set of tuners can be associated with a configuration, such as those shown above in Tables (1) and (2). The configurations describe how tuners in the set relate to one another, usually with respect to some selected characteristics, such as the access quality they can provide or the number of channels they can access.

At block 604, tuner allocation policies are assigned to the identified configuration. The assigned tuner allocation policies govern assignment and swapping of identified tuners in response to multimedia tasks, i.e., requests to view and/or record channels in a unified lineup, channel surf, etc. The policies generally aim to produce a user experience that is seamless and powerful as compared with conventional multimedia user experiences. This can be achieved, for example, by policies that flexibly allocate tuners so that those tuners that deliver the highest access quality are used first, and/or tuners with the least bandwidth are used first, if these tuners can handle the task at hand. These types of policies enhance the user experience by aiming to always provide the highest access quality while efficiently saving the more powerful resources for potential future tasks. An exemplary UXE 202 can harness the power of multiple heterogeneous tuners, which can be efficiently assigned to tasks and swapped on-the-fly and in the background to provide an unparalleled user experience for digital media enthusiasts.

FIG. 7 shows an exemplary method 700 of allocating tuners to empower a user experience. In the flow diagram, the operations are summarized in individual blocks. The operations may be performed in hardware and/or as machine-readable instructions (software or firmware) that can be executed by a processor or engine, such as an exemplary TunerIE 400 of an exemplary UXE 202.

At block 702, diverse channel lineups associated with multimedia tuners are integrated into a unified channel lineup. A lineup integrator 408 of an exemplary TunerIE 400 may perform this lineup unification by interleaving channels, by resolving channels that are duplicated across multiple tuners, and by resolving conflicting channel numbers across the diverse lineups. The unified channel lineup thus achieved provides a powerful platform for fulfilling a user's viewing and recording requests. Without the user being able to perceive irregularities, the multiple heterogeneous tuners are seamlessly engaged and disengaged in the background to surf channels of the unified lineup, perform multiple recording tasks simultaneously, perform viewing concurrently with the multiple recording tasks, etc., all made possible by organizing and harnessing the multiple heterogeneous tuners according to allocation policies.

Thus, at block 704, at least some of the multiple tuners are dynamically assigned to viewing and recording tasks of the unified lineup, according to the policies. A tuner assignment engine 410 may streamline tuner assignment and swapping by keeping a primary viewing tuner 510 and a primary recording tuner 512 as free and as available as possible. The primary viewing tuner 510 and the primary recording tuner 512 can be used first when a task is requested, thus short-circuiting voluminous policy and decision-making calculations.

Alternatively, a tuner assignment engine 410 may keep a prioritized viewing tuner list 514 and a prioritized recording tuner list 516 to streamline policy and operation. When a tuner is needed for a given task, the tuner highest on the appropriate list that is able to tune the requested channel is engaged without further ado. This results in quick operation and elegant tuner allocation policy 518.

At block 706, one or more assigned tuners are swapped as needed with other tuners in response to incoming requests. The swapping may be performed on-the-fly, that is, during the middle of an assigned task for one of the tuners, in order to fulfill policy and equilibrate the requested tasks. Thus, a heavy load of recording requests might result in several of the best viewing tuners being recruited—swapped into—the recording tasks, despite a policy of keeping the tuners with the most bandwidth free if a tuner with less bandwidth can do the same task just as well.

When the exemplary method 700 is implemented by an exemplary UXE202, the power of coordinated heterogeneous tuners provides a UX in which the user can perform more multimedia tasks simultaneously, with seamless automatic assignment and switching of the tuners.

Exemplary Computing Device Environment

Figure 8:
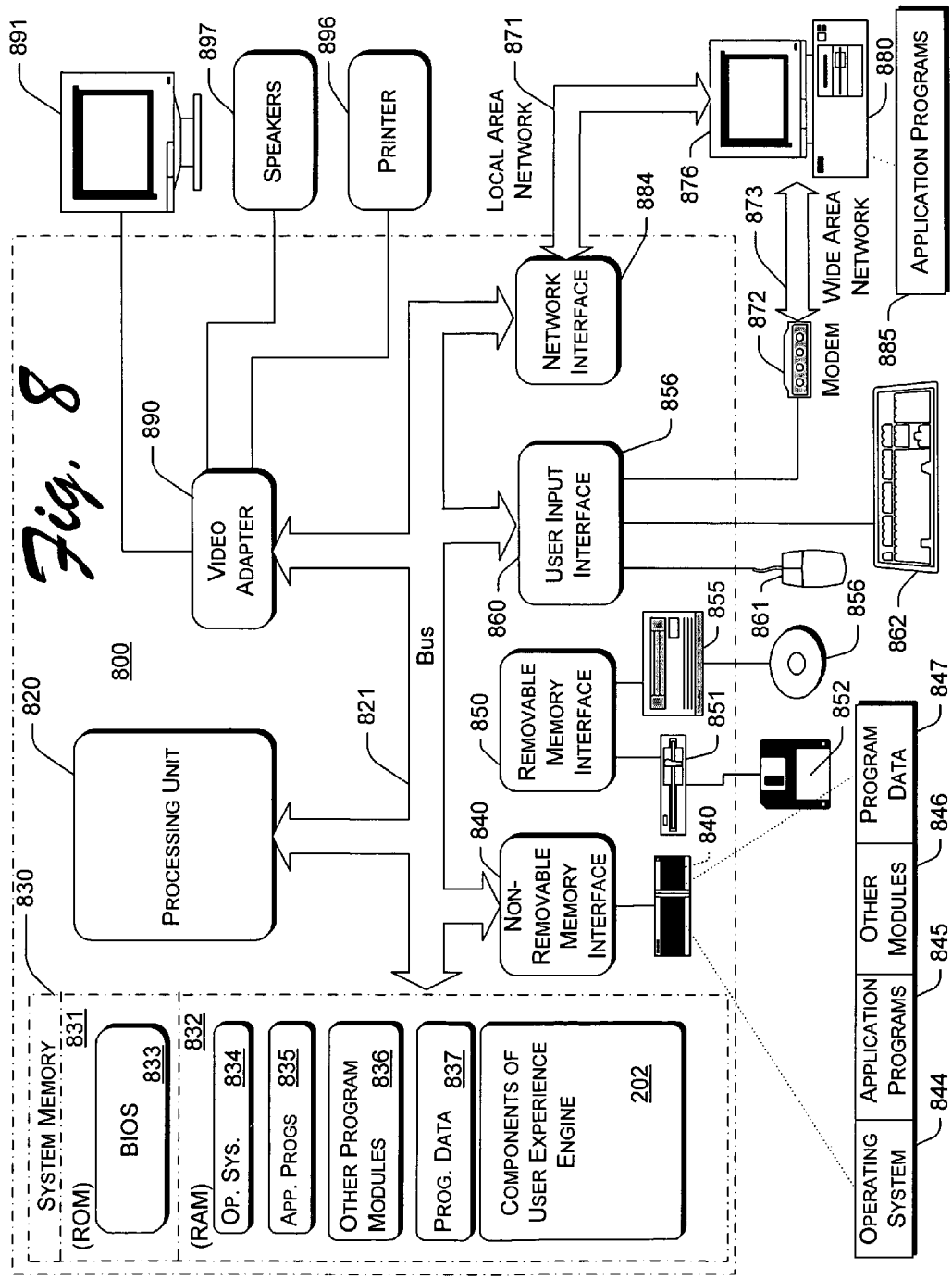
FIG. 8 is a block diagram of an exemplary computing device environment for practicing the subject matter.

FIG. 8 shows an exemplary computing device 800 suitable as an environment for practicing aspects of the subject matter, for example the exemplary computing device 800 can underlie or perform aspects of a hub or server for a home multimedia network, as described above with respect to FIG. 3. The components of exemplary computing device 800 may include, but are not limited to, a processing unit 822, a system memory 830, and a system bus 821 that couples various system components including the system memory 830 to the processing unit 822. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Exemplary computing device 800 may include a variety of computer-readable media. Computer-readable media can be any available media that can be accessed by exemplary computing device 800 and includes both volatile and non-volatile media, removable and non-removable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by exemplary computing device 800. Communication media may embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within exemplary computing device 800, such as during start-up, may be stored in ROM 831. RAM 832 may contain data and/or program modules that are immediately accessible to and/or presently being operated on by processing unit 822. By way of example, and not limitation, FIG. 8 illustrates in RAM 832 an operating system 834, application programs 835, other program modules 836, and program data 837, Although some components of an exemplary media network are depicted as software in random access memory 832, such as components of an exemplary user experience engine (UXE) 202, other implementations of an exemplary media network can be hardware or combinations of software and hardware.

The exemplary computing device 800 may also include other removable/non-removable, volatile/nonvolatile computer storage media. By way of ex illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 can be connected to the system bus 821 through a non-removable memory interface such as interface 840, and magnetic disk drive 851 and optical disk drive 855 can be connected to the system bus 821 by a removable memory interface such as interface 850.

The drives and their associated computer storage media discussed above and illustrated in FIG. 8 provide storage of computer-readable instructions, data structures, program modules, and other data for exemplary computing device 800. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the exemplary computing device 800 through input devices such as a keyboard 862 and pointing device 861, commonly referred to as a mouse, trackball, or touch pad. Other input devices (not shown) may include a microphone, joystick, game pad, satellite dish, scanner, or the like. These and other input devices are often connected to the processing unit 822 through a user input interface 860 that is coupled to the system bus, but may be connected by other interface and bus structures, such as a parallel port, game port, or a universal serial bus (USB). A monitor 891 or other type of display device is also connected to the system bus 821 via an interface, such as a video interface 890. In addition to the monitor 891, computers may also include other peripheral output devices such as speakers 897 and printer 896, which may be connected through an output peripheral interface 895.

The exemplary computing device 800 may operate in a networked environment using logical connections to one or more remote computers, such as a remote computer 880. The remote computer 880 may be a personal computer, a server, a router, a network PC, a peer device or other common network node, and often includes many or all of the elements described above relative to exemplary computing device 800, although only a memory storage device 881 has been illustrated in FIG. 8. The logical connections depicted in FIG. 8 include a local area network (LAN) 871 and a wide area network (WAN) 873, but may also include other networks. Such networking environments are commonplace in offices, enterprise-wide computer networks, intranets, and the Internet.

When used in a LAN networking environment, the exemplary computing device 800 is connected to the LAN 871 through a network interface or adapter 870. When used in a WAN networking environment, the exemplary computing device 800 often includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the exemplary computing device 800, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

CONCLUSION

The foregoing describes exemplary systems for unifying heterogeneous multimedia tuners. Some of the subject matter described above can be implemented in hardware, in software, or in both hardware and software. In certain implementations, the exemplary system and related methods may be described in the general context of computer-executable instructions, such as program modules, being executed by a computer. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
  identifying multiple tuners for accessing multimedia channels, wherein at least one of the tuners is capable of uniquely accessing one or more of the multimedia channels;
  creating a unified lineup of the multimedia channels;
  dynamically assigning the tuners to fulfill access requests for viewing and/or recording multimedia content of the multimedia channels in the unified lineup according to one or more policies;
  creating a list of viewing tuners selected from the multiple tuners, wherein the listed viewing tuners are prioritized according to the one or more policies;
  creating a list of recording tuners selected from the multiple tuners, wherein the listed recording tuners are prioritized according to the one or more policies;
  in response to access requests for viewing and/or recording the multimedia content, dynamically assigning tuners from the list of viewing tuners and from the list of recording tuners according to the one or more policies and swapping an assigned tuner as needed to fulfill the one or more policies; and
  wherein the list of viewing tuners:
  relates each channel in the unified lineup to the viewing tuners that are capable of accessing the channel,
  prioritizes the viewing tuners according to the access quality that each viewing tuner is capable of providing, and
  prioritizes the viewing tuners according to the number of multimedia channels in the unified lineup that each viewing tuner is capable of accessing.

2. The method as recited in claim 1, wherein the dynamically assigning includes swapping tuners during an access of the multimedia content to uphold the one or more policies.

3. The method as recited in claim 1, wherein said at least one of the tuners has unique access to a multimedia content.

4. The method as recited in claim 1, wherein said at least one of the tuners has a capability of providing a unique access quality.

5. The method as recited in claim 1, wherein the one or more policies include, in response to one of the access requests, assigning a tuner to the access request that delivers higher quality over assigning a tuner that delivers lower quality.

6. The method as recited in claim 1, wherein the multimedia channels deliver one of audio content, video content, or data content.

7. The method as recited in claim 1, wherein the one or more policies include, in response to one of the access requests, assigning a tuner that is capable of accessing a lesser number of channels prior to assigning a tuner that is capable of accessing a greater number of channels, if the tuner that is capable of accessing a lesser number of channels is capable of fulfilling the access request.

8. The method as recited in claim 1, wherein the one or more policies include designating a primary viewing tuner and a primary recording tuner to be assigned first, if available, to respective viewing and recording tasks.

9. The method as recited in claim 1, further comprising dynamically swapping an assigned tuner to fulfill the one or more policies.

10. The method as recited in claim 1, further comprising classifying a relationship between a first tuner and a second tuner of the identified tuners and determining the one or more policies based on the classifying.

11. The method as recited in claim 10, wherein the relationship comprises mutual exclusivity between a first set of channels tuned by the first tuner and a second set of channels tuned by the second tuner.

12. The method as recited in claim 10, wherein the relationship includes an identity of channels tunable by the first and second tuners, wherein the first and second tuners access the identical channels at different levels of access quality.

13. The method as recited in claim 10, wherein the classifying comprises determining a relationship between a first tuner that accesses a set of channels and a second tuner that accesses a subset of the set of channels.

14. The method as recited in claim 10, further comprising determining a relationship between the first and second tuners based on both a difference in channels accessed by the first and second tuners and a difference in access quality provided by the first and second tuners.

15. A method, comprising:
  identifying multiple tuners for accessing multimedia channels, wherein at least one of the tuners is capable of uniquely accessing one or more of the multimedia channels;
  creating a unified lineup of the multimedia channels;

dynamically assigning the tuners to fulfill access requests for viewing and/or recording multimedia content of the multimedia channels in the unified lineup according to one or more policies;

creating a list of viewing tuners selected from the multiple tuners, wherein the listed viewing tuners are prioritized according to the one or more policies;

creating a list of recording tuners selected from the multiple tuners, wherein the listed recording tuners are prioritized according to the one or more policies;

in response to access requests for viewing and/or recording the multimedia content, dynamically assigning tuners from the list of viewing tuners and from the list of recording tuners according to the one or more policies and swapping an assigned tuner as needed to fulfill the one or more policies; and wherein the list of recording tuners:

relates each channel in the unified lineup to the recording tuners that are capable of accessing the channel, prioritizes the recording tuners according to the access quality that each recording tuner is capable of providing, and prioritizes the recording tuners according to the number of multimedia channels in the unified lineup that each recording tuner is capable of accessing.

16. A tuner integration engine, comprising:
a lineup integrator to unify heterogeneous channel lineups associated with multiple tuners into a unified channel lineup;
a tuner prioritizer to sort the multiple tuners according to one or more abilities; and
a tuner assignment engine to assign one of the tuners to a multimedia task according to a policy;
wherein the tuner prioritizer further includes:
   a lineup comparator to prioritize tuners according to the number of channels that each tuner can access;
   a channel-to-tuner correlator to associate each prioritized tuner with the channels the tuner is capable of accessing; and
   a signal quality detector to prioritize tuners according to an access quality provided by each tuner.

17. The tuner integration engine as recited in claim 16, wherein the lineup integrator further includes:
a duplicated channel resolver to map channels duplicated across multiple tuners to a single channel number in the unified channel lineup;
a conflicting channel number resolver to assign channels competing for the same channel number to different channel numbers; and
a channel interleaver to order the channels into the unified channel lineup.

18. The tuner integration engine as recited in claim 16, wherein the tuner assignment engine further includes:
tuner allocation policies to govern assignment of tuners to tasks;
a tuner assignor to match one of the tuners to a multimedia task according to one of the policies; and
a tuner swapper to swap tuners according to one of the policies in response to a request to assign a tuner to a new multimedia task.

19. The tuner integration engine as recited in claim 18, wherein the tuner allocation policies include one of:
presenting a user with a highest available access quality, favoring higher access quality tuners for assignment to a task over lower access quality tuners,
freeing for a future task the tuners that are capable of accessing a greater number of channels, and
allocating to tasks the tuners that are capable of accessing the least number of channels, if the tuners that access the least number of channels are capable of performing the tasks.

20. The tuner integration engine as recited in claim 16, wherein the tuner assignment engine further has access to a viewing tuner list of prioritized viewing tuners and a recording tuner list of prioritized recording tuners.

21. The tuner integration engine as recited in claim 16, further comprising a configuration classifier to determine a relationship between two or more or the heterogeneous tuners and determine the tuner allocation policies based on the relationship.

22. A system, comprising:
means for identifying heterogeneous tuners for accessing multimedia channels, wherein at least one of the tuners is capable of uniquely accessing one or more of the multimedia channels;
means for creating a unified lineup of channels accessed by the heterogeneous tuners;
means for dynamically assigning the tuners for viewing and/or recording the multimedia channels, according to the one or more policies;
means for creating a list of viewing tuners selected from the multiple tuners, wherein the listed viewing tuners are prioritized according to the one or more policies;
means for creating a list of recording tuners selected from the multiple tuners, wherein the listed recording tuners are prioritized according to the one or more policies;
means for dynamically assigning tuners from the list of viewing tuners and from the list of recording tuners according to the one or more policies and swapping an assigned tuner as needed to fulfill the one or more policies, in response to access requests for viewing and/or recording the multimedia content;
means for relating each channel in the unified lineup to the viewing tuners that are capable of accessing the channel,
means for prioritizing the viewing tuners according to the broadcast quality that each viewing tuner is capable of delivering, and
means for prioritizing the viewing tuners according to the number of multimedia channels in the unified lineup that each viewing tuner is capable of accessing.

23. The system as recited in claim 22, wherein the one or more policies optimize access quality for a user experience and conserve bandwidth of the heterogeneous tuners during use of one or more of the tuners.

24. The system as recited in claim 22, further including means for swapping tuners during an access of the multimedia content to uphold the one or more policies.

25. A system, comprising:
means for identifying heterogeneous tuners for accessing multimedia channels, wherein at least one of the tuners is capable of uniquely accessing one or more of the multimedia channels;
means for creating a unified lineup of channels accessed by the heterogeneous tuners;
means for dynamically assigning the tuners for viewing and/or recording the multimedia channels, according to the one or more policies;
means for creating a list of viewing tuners selected from the multiple tuners, wherein the listed viewing tuners are prioritized according to the one or more policies;

means for creating a list of recording tuners selected from the multiple tuners, wherein the listed recording tuners are prioritized according to the one or more policies; and means for dynamically assigning tuners from the list of viewing tuners and from the list of recording tuners according to the one or more policies and swapping an assigned tuner as needed to fulfill the one or more policies, in response to access requests for viewing and/or recording the multimedia content;

means for relating each channel in the unified lineup to the recording tuners that are capable of accessing the channel, means for prioritizing the recording tuners according to the broadcast quality that each recording tuner is capable of delivering, and means for prioritizing the recording tuners according to the number of multimedia channels in the unified lineup that each recording tuner is capable of accessing.

* * * * *